Oct. 10, 1967   R. LARA   3,346,840
DOUBLE SONOGRAMMING FOR SEISMIC RECORD IMPROVEMENT
Filed July 23, 1964   7 Sheets-Sheet 1

INVENTOR
ROLANDO LARA
BY
ATTORNEYS

Oct. 10, 1967  R. LARA  3,346,840
DOUBLE SONOGRAMMING FOR SEISMIC RECORD IMPROVEMENT
Filed July 23, 1964  7 Sheets-Sheet 2

INVENTOR
ROLANDO LARA
BY
ATTORNEYS

Oct. 10, 1967 R. LARA 3,346,840
DOUBLE SONOGRAMMING FOR SEISMIC RECORD IMPROVEMENT
Filed July 23, 1964 7 Sheets-Sheet 3

INVENTOR
ROLANDO LARA
BY
ATTORNEYS

Oct. 10, 1967   R. LARA   3,346,840
DOUBLE SONOGRAMMING FOR SEISMIC RECORD IMPROVEMENT
Filed July 23, 1964   7 Sheets-Sheet 4

INVENTOR
ROLANDO LARA
BY
ATTORNEYS

Oct. 10, 1967  R. LARA  3,346,840
DOUBLE SONOGRAMMING FOR SEISMIC RECORD IMPROVEMENT
Filed July 23, 1964  7 Sheets-Sheet 5

INVENTOR
ROLANDO LARA
BY *J. E. Johnston*
*George W. Wasson*
ATTORNEYS

Oct. 10, 1967  R. LARA  3,346,840
DOUBLE SONOGRAMMING FOR SEISMIC RECORD IMPROVEMENT
Filed July 23, 1964  7 Sheets-Sheet 6

INVENTOR
ROLANDO LARA
BY
ATTORNEYS

Oct. 10, 1967         R. LARA         3,346,840
DOUBLE SONOGRAMMING FOR SEISMIC RECORD IMPROVEMENT
Filed July 23, 1964                    7 Sheets-Sheet 7

INVENTOR
ROLANDO LARA
BY *J.E. Johnston*
*George W. Wasson*
ATTORNEYS

United States Patent Office 3,346,840
Patented Oct. 10, 1967

3,346,840
DOUBLE SONOGRAMMING FOR SEISMIC
RECORD IMPROVEMENT
Rolando Lara, Hacienda Heights, Calif., assignor to Chevron Research Company, a corporation of Delaware
Filed July 23, 1964, Ser. No. 384,725
9 Claims. (Cl. 340—15.5)

This invention relates to processing of data contained in a simultaneous plurality of signals whose amplitudes vary with time, and more particularly to the processing of seismic data found in a multitrace seismic record.

The modern procedure for collecting seismic information involves the initiation of a seismic disturbance at the earth's surface and the detection of energy reflected by subsurface horizons at a plurality of surface geophones. The geophones are usually positioned in an arrany along a straight line and the source of the seismic disturbance is The reflected energy detected by the surface geophones is usually converted to electrical signals and then recorded usually positioned at the center of the geophone array. as amplitude varying traces on a multitrace seismic record. The modern seismic record is a reproducible record usually in the form of magnetic tape.

The individual traces of the seismic record contain both signal and noise. The signal and noise appear in the form of amplitude variations along the trace. The signal and some of the noise is caused by movements of the earth's surface due to reflections of the energy derived from the seismic disturbance. Additional noise may result from movements of the earth's surface having no relationship to the initiated seismic disturbance as well as from system noises involved in the detection, amplification and recording of the seismic traces. The usual distinction between the signals on the seismic record and the noise on the seismic record is that the signal appears to be coherent from trace to trace and the noise tends to be random, or incoherent.

Most of the procedures employed in processing the data contained in the multitrace seismic record have as their purpose the improvement of the signal-to-noise ratio within the seismic record. The purpose of the present invention is to improve the signal-to-noise ratio of a seismic record by processing the information contained in the seismic record in a manner such that the coherent signal information is enhanced and the incoherent noice information is reduced.

It should be understood that energy reflected from a seismic reflector directly below the geophone array will generally strike each of the geophones at the same time. A multitrace record of this information would indicate corresponding amplitude changes at the same times along each trace derived from each individual surface geophone. Energy reflected from subsurface beds other than directly below the surface array will cause energy to be reflected to the earth's surface having a nonvertical direction of travel with respect to the array. This energy will strike a geophone at one end of the array earlier than it strikes the geophone at the opposite end of the array. The recorded signals representing this energy will show corresponding amplitude changes on the different traces at different times with the difference in time between the indication of the event on adjacent traces being determined by the deviation of the wavefront from the vertical.

When an amplitude change is recognizable in all, or nearly all, the traces of the record, and when it "lines up" across the record, appearing on each succeeding trace, say, a little later (or earlier) than on the trace just before, that amplitude change is said to represent an "event." The angle across the record made by the amplitude changes of an event is known as "moveout," and the moveout of an event is conventionally measured and described in terms of the time difference between its arrival at the first geophone and its arrival at the last geophone. This delay may be, for instance, 100 milliseconds.

Reflections from extended formational interfaces will tend to cause energy to appear in a coherent manner across the record, and noise will tend to appear randomly across the record. The noise due to incoherent seismic information will tend to appear at random times along, as well as across, the entire record. The instrumentation noise due to the processes of amplification and recording will also tend to be randomized throughout the record. In accordance with the procedure of the present invention, the seismic record will first be processed to produce a set of directional traces indicating energy that has been reflected from extended formational interfaces into the geophones preferentially from specified directions; than those directional traces will be reprocessed to produce a seismic record appearing generally like the original record but having the coherent information emphasized more than it was in the original record. In other words, the newly produced multitrace record will have an improved signal-to-noise ratio.

The objects and features of the present invention will be readily apparent to thse skilled in the art from the specification and appended drawings illustrating a preferred embodiment wherein.

Figure 1:
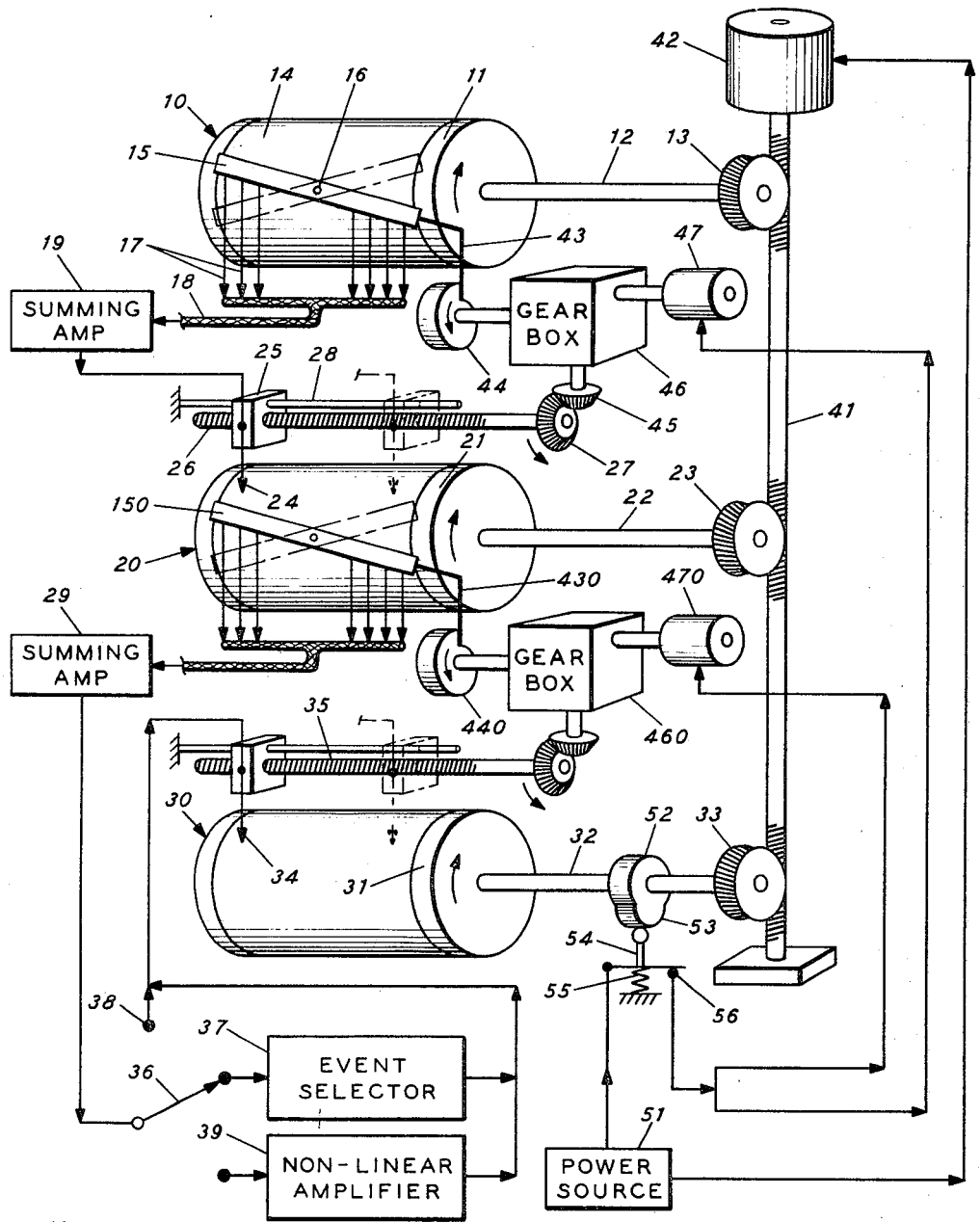
FIGURE 1 is a schematic illustration of one form of apparatus capable of performing the method of the present invention.

The operating concept of a preferred embodiment for performing the seismic record processing scheme of the present invention can be best understood by referring first to FIGURE 1. In that figure three separate magnetic tape recording and playback systems are illustrated at 10, 20 and 30. To perform the method of the present invention, at least two of these systems are necessary. The third system is, in general, a duplicate of the second system and may be eliminated under conditions that will become evident from the later description. For ease in description of the invention, the three systems are shown; however, it should be understood that other combinations of the apparatus as well as other types of recording and reproducing systems are contemplated.

The first magnetic recording system 10 constitutes a drum 11 supported on rotatable drive shaft 12 driven by a suitable mechanism such as gear 13 and worm shaft 41 driven by motor 42. Actual record processing in accordance with the present invention will require careful speed control for rotation of the systems 10, 20 and 30 as well as synchronization between the rotation of the drums and movements of the pickup heads in each system. The drum 11 is adapted with apparatus, not shown, for securing a seismic record in the form of a magnetic tape 14 to the periphery of the drum. A plurality of magnetic pickup heads, not individually illustrated, are carried by a pivotally mounted head moving bar 15 illustrated with its pivot at its center 16. The individual pickup heads reproduce the traces of the seismic record in the form of electrical signals and these signals are transmitted through conductors 17 and cable 18 as individual signals to a summing amplifier 19.

The pivotally mounted head moving bar 15 is moved about its pivot 16 by movement of a mechanical push rod 43 following a cam 44 rotated in a step-by-step manner through gear box 46 from motor 47. The cam is appropriately designed to provide for a total movement of the head moving bar 15 in a step-by-step manner between its pivotal limits in a predetermined number of revolutions of the drum 11. After each single revolution of the drum 11, motor 47 is energized to cause one step of movement of the cam 44. It should be understood that different schemes may be employed to provide individual control for the movement of each of the reproducing heads and also that cams of a different contour may be employed to accomplish other head movement programs.

In apparatus actually used to carry out the method of this invention the magnetic pickup heads are not mounted on a simple bar. Instead they are mounted on separate members that are capable of individual circumferential movements around the drum. The bar-type mechanism is illustrated here for didactic clarity.

The recording system 20 comprises a grouping of apparatus including substantially a duplication of the previously described head moving bar and cam driving mechanism found in the recording system 10. The magnetic tape carrying portion of system 20 constitutes a drum 21 mounted on shaft 22 and rotatably driven by a mechanism such as gear 23 in engagement with worm 41 driven by motor 42.

The signals recorded in recording system 20 are supplied from summing amplifier 19 to a signal recording head 24 mounted on a threaded block 25 positioned by rotation of worm 26. The threaded block 25 is guided by fixed rod 28 to prevent its rotation about worm 26. Worm 26 is driven from the gear box 46 by gear 45 and its engagement with gear 27. Energization of motor 47 causes rotation of gear 45 and the consequent movement of the recording head 24 parallel to the axis of the drum 21. It should be apparent now that the pitch of worm 26 and the contour of cam 44 are so related that head 24 is moved step-by-step from one side of the drum to the other while cam 44 makes one complete revolution to move the head moving bar 15 from one limiting position to another.

In accordance with the scheme of the present invention, each transverse alignment of the individual reproducing heads established by positioning of the head moving bar 15 is employed for the generation of one directional trace of seismic energy. The individual directional trace is produced in the summing amplifier 19 and is transmitted to the recording head 24 of the recording system 20. After the head moving bar 15 has been moved to the position illustrated in phantom on drum 11, the recording head 24 will have been moved to the position illustrated in phantom on drum 21 and a full record of directional traces will have been completed. These directional traces may then be processed to produce the transformed record of the present invention.

The elements of the recording system 20 that duplicate the elements of system 10 are used to complete the transformation of the original record. After the entire record of directional traces has been recorded on the record of drum 21, the record is transformed by reproducing each of the individual signals along each trace of that record and again summing these signals. The signals are reproduced by the individual heads carried by the head moving bar 150 to provide individual signals to the summing amplifier 29. The head moving bar 150 is suitably driven in a step-wise manner from a mechanical push rod 430 driven by a cam 440 rotated in a step-by-step manner through a gear box 460 from a motor 470. The drive mechanism for the head moving bar 150 may be a duplicate of the drive system employed for moving head moving bar 15; or, if a different summing program is to be used, the cam 440 or the gear ratio of gear box 460 may be appropriately designed for the desired movements.

The magnetic recording system 30 constitutes a rotatable drum 31 mounted on shaft 32 driven by gear 33 through engagement with worm 41 rotated by motor 42. A single recording head 34 is provided in the system 30 to record the signals supplied from summing amplifier 29 through the signal treatment circuits illustrated. Recording head 34 is positioned parallel to the axis of the drum in accordance with rotation of worm 35 driven from drive motor 48 by a mechanism similar to that employed in system 20. In accordance with the persent invention, the signals supplied to the recording head 34 may be processed through any of a plurality of individual trace treatment elements. As illustrated in FIGURE 1, the output of summing amplifier 29 is supplied to selector switch 36 and through the movable contact of the switch to either an event selector 37, a nonlinear amplifier 39 or a bypass circuit at contact 38. The output of the elements 37 and 39 and the bypass at contact 38 is connected through a common conductor to recording head 34.

Energization of the system illustrated in FIGURE 1 is provided from a power source 51 feeding the motor 42 and also the motors 47 and 470 when they are connected through switch 56. The switch 56 is closed by cam 53 on shaft 32. Cam 53 pushes on rod 54, against the biasing spring 55, to close the contacts of switch 56. The eccentric projection 52 of cam 53 comes into engagement during only one part of the revolution of shaft 32, and that is during that part of the revolution in which the magnetic tape on drum 31 is in such a position that the head 34 is in the peripheral gap between the beginning and end of the tape. During the relatively short time that head 34 is in that gap, and therefore not transmitting any useful information, head 34 is repositioned axially along drum 31, and at the same time, recording head 24 and all the reading heads on drum 21 are repositioned, and all the reading heads on drum 11 are repositioned. All the while, the drums 11, 21, and 31 themselves continue to revolve at a constant rate. When contacts 56 are closed the motors 47 and 470 are energized.

Figure 12:
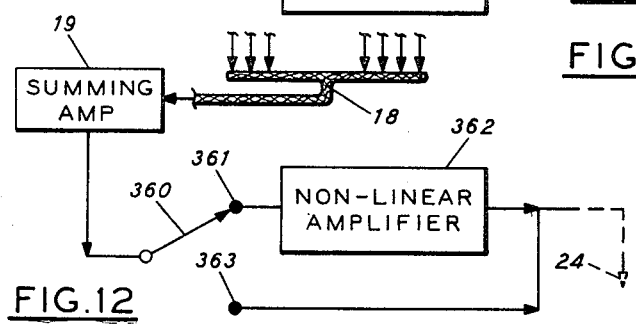
FIGURE 12 is an alternative arrangement of circuit elements used in the method of the present invention.

An alternative organization of the circuit and mechanical elements is provided by switch 360 as illustrated in FIGURE 12. Switch 360, when closed to contact 361, adds a nonlinear amplifier 362 between summing amplifier 19 and recording head 24 and, when closed to contacts 363, provides a direct connection as illustrated in FIGURE 1. The alternative circuit is employed to produce the record of FIGURE 8 and will be described hereinafter.

The operation of the apparatus illustrated in FIGURE 1 should be readily apparent from the drawings and the preliminary remarks of this specification. The method of the invention is understood best by reference to FIGURES 2–11 illustrating diagrammatically the improvements accomplished by treating a seismic record in the manner of the present invention. Considering first the diagrammatic illustration of FIGURE 2, in that figure a seismic record of twenty-four seismic traces is illustrated, each trace representing the signals detected by a surface geophone in response to energy reflected to the geophone by a subsurface reflector from a charge exploded at the earth's surface. The time axis of the record runs from left to right and the wave-like wiggles represent signals detected by the geophones and derived from the reflected energy. At three places amplitude variations appear that have no continuity from trace to trace. These are designated noise. Reflection energy from extended subsurface formations is here ideally illustrated as wiggles appearing coherently across all traces.

Figure 2:
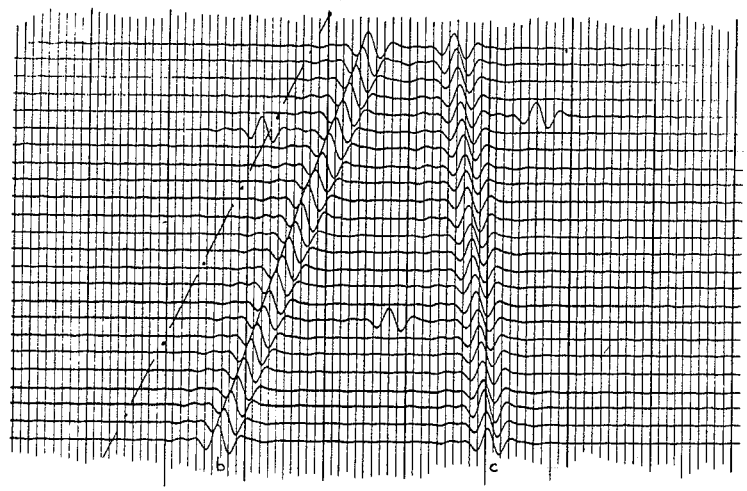
FIGURE 2 is a diagrammatic illustration of a seismic record containing both seismic signal and noise.

In accordance with the present invention a magnetic tape representing a record such as that illustrated in FIGURE 2 will be placed on the magnetic recording system 10. The traces of the record will first have received static and dynamic time corrections in the conventional manner. Such corrections take into account possible differences in elevation of the geophones, and the positions of the geophones with respect to the position of the seismic disturbance. They also take into account, when possible, peculiarities of the "weathered" layer of earth just below the geophones.

As illustrated in FIGURE 1, the pivotally mounted head moving bar 15 is adjusted to reproduce signals along the right hand side of the record 14 earlier than signals along the left hand side of that same record. In FIGURE 2 the approximate alignment of the head moving bar 15 with respect to the record 14 is illustrated by the dot-dashed line. The moveout represented by that alignment is shown to be greater than that of event b labeled in FIGURE 2. As the record is processed, the magnetic tape is moved under the reproducing heads to reproduce the signal variations in and along each trace. These signals are transmitted to the summing amplifier 19 and a single directional trace is generated for each complete revolution of the drum 10. After each complete revolution the head moving bar is moved to a new alignment with respect to the record by energization of motor 47 causing movement of the cam 44 and the push rod 43. After a prescribed number of rotations of the drum 10 and the subsequent rotations of the cam 44, the head moving bar 15 will have been rotated to the position illustrated in phantom in FIGURE 1 and the entire record will have been reproduced with each rotation of the drum. The signal reproduced by each of the heads will be carried to a summing amplifier 19 to produce a sum trace representing the summation of all signals reproduced by all of the heads, one sum trace being produced for each revolution of the drum.

Figure 3:
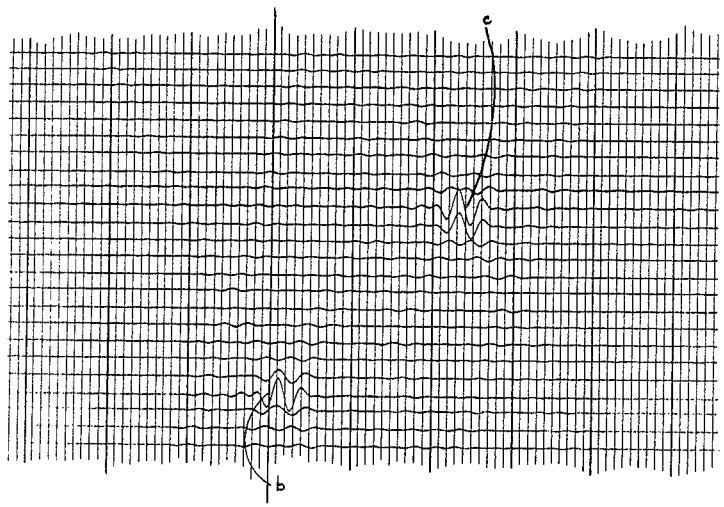
FIGURE 3 is a record of directional traces produced from the diagrammatic seismic record of FIGURE 2.

FIGURE 3 shows the result of the above described operation. It is convenient to call a derived record such as that of FIGURE 3 a "sonogram." Records similar in principle to this record were, to our knowledge, first produced by Frank Rieber in his "Sonograph" method. [Geophysics XIII (1948) 659–661, also Geophysics I (1936), 97–106.] The individual traces of the sonogram correspond to individual moveouts on the original seismic record. The "events" on the sonogram correspond to events on the original record, but they are explicitly sorted out according to the directions from which they came toward the detecting geophones. In examining FIGURE 3 it is helpful to recognize that in its production the bottom trace (Trace number 24) was produced first, and the top trace (Trace number 1) was produced last. The bottom trace corresponds to the moveout indicated by the dot-dashed line in FIGURE 2. The two events labeled b and c in FIGURE 3 correspond to the two events, b and c in FIGURE 2. It should be noted that wherever there is a coherent amplitude variation in each trace across the original record having reasonable alignment from trace to trace, the directional trace representing the summation of all of those signals will have a relatively large amplitude signal variation whereas the other directional traces off of alignment with the coherent signals will have a relatively smaller representation of the original amplitude variation.

As indicated by the above-cited reference, records of the type represented by FIGURE 3 have been known, so that there has been ample evaluation of their usefulness, and also of their limitations. The sonogram gives the user a picture of the signals sorted out according to their directions. Directional sorting is immediately helpful because, in the usual type of seismic exploration for petroleum, events of small moveout (whose waves arrive at small angles from the vertical) are most likely to represent the deep formational interfaces that are sought. Furthermore, the sonogram deemphasizes incoherent signals such as the three isolated wiggles shown on FIGURE 2. The representation of these wiggles is much less obvious in FIGURE 3 than it is in FIGURE 2, although it can be shown theoretically that if the sonogram is exactly made (with ideally-behaving recorders and reproducers) all of the information in the original record of FIGURE 2 can be preserved and represented in the derived sonogram of FIGURE 3. [A. W. Trorey: "The Information Content of a Rieber Sonogram," Geophysics XXVI (1961), 761–764.]

In spite of the above-described helpful features, the sonogram has not enjoyed wide use in exploration geophysics, and although it might be presumptuous to make a confident, categorical statement as to reasons for the lack of wide use, it is believed that one important reason is a partly psychological one. The sonogram is too abstract, compared to the original record. The original record can be turned sideways (right end down) and the coherent wiggles can be visualized as reflecting interfaces in space (the appropriate mathematical transformations being visualized between a time axis and a vertical directional axis, and the appropriate corrections being considered for velocity variations with depth). No such intuitively-appealing visualization is possible for the sonogram. The coordinates of moveout versus time do not permit any such quick mental transposition, even in a qualitative sense.

Now, it is the essence of the present invention to use the advantages of the sonogram, and also to overcome its shortcomings, by making another transformation of the sonogram, similar to the transformation by which it was produced. It will be realized, at this point, that the electromechanical details of making such a transformation have already been taught in the above description relating to FIGURE 1.

Figure 4:
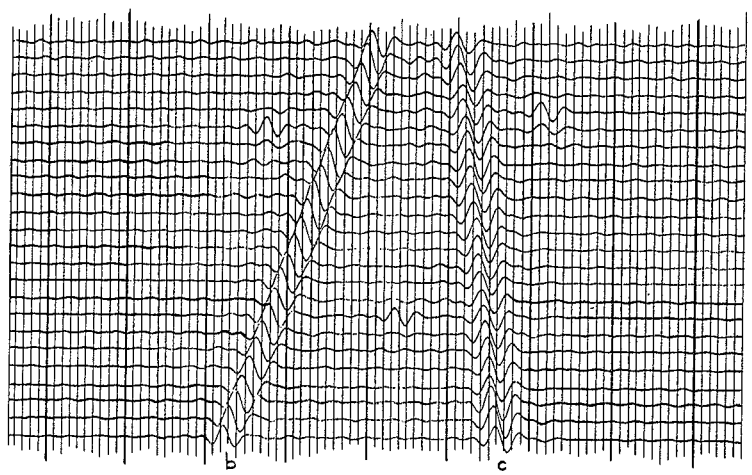
FIGURE 4 is an improved multitrace seismic record corresponding to the original record of FIGURE 2, but showing less noise than the original record. The record of FIGURE 4 was derived from processing the record of FIGURE 3 in accordance with the method of the present invention.

FIGURE 4 is a transformation of FIGURE 3, related to FIGURE 3 as FIGURE 3 was related to FIGURE 2.

The outstanding feature of the retransformed record of FIGURE 4 is that its general appearance is similar to that of the original record of FIGURE 2. It can be shown mathematically that this similarity is more than coincidental, and that the retransformed record of FIGURE 4 can justifiable be labeled with the same coordinates as was the original record (location versus arrival time). It can also be shown that the retransformed record represents the original record in a filtered form, but not filtered as by one of the familiar electrical filters that discriminate on the basis of frequency, but by a new type of filter that discriminates on the basis of moveout. For brevity, it is convenient to characterize the entire process as a "moveout-filtering process" or to speak of the record of FIGURE 4 as the record of FIGURE 2 after it has gone through a "moveout filter."

The example record of FIGURE 4 was purposefully made to indicate that all of the information on the original record of FIGURE 2 can be preserved in the described filtering process. Even the three incoherent "noise" pulses of FIGURE 2 still show in FIGURE 4, indicating that those three pulses were actually still represented in the sonogram of FIGURE 3, although their manifestation was subtle. However, the example record of FIGURE 4 was purposefully made to show also at least some of the noise deemphasis that is possible using the present invention. It will be noted that whereas the three incoherent noise pulses of FIGURE 1 had amplitudes equal to, or even slightly greater, than those of the coherent pulses representing the desired events, in the record of FIGURE 4, the amplitudes of the incoherent, noise pulses are relatively depressed. Much more dramatic noise deemphasis is possible, as will be shown below.

Figure 5:
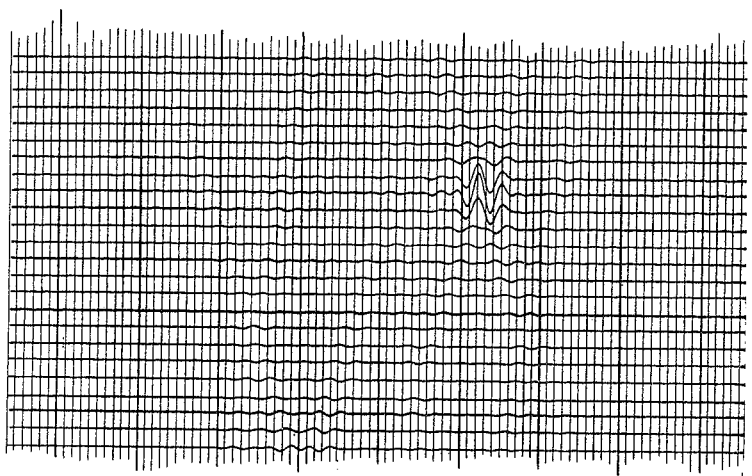
FIGURE 5 is a record of directional traces produced from the record of FIGURE 2 but with a smaller range of moveouts than that used in preparing FIGURE 3, so as to discriminate against an event of undesired moveout.
Figure 6:
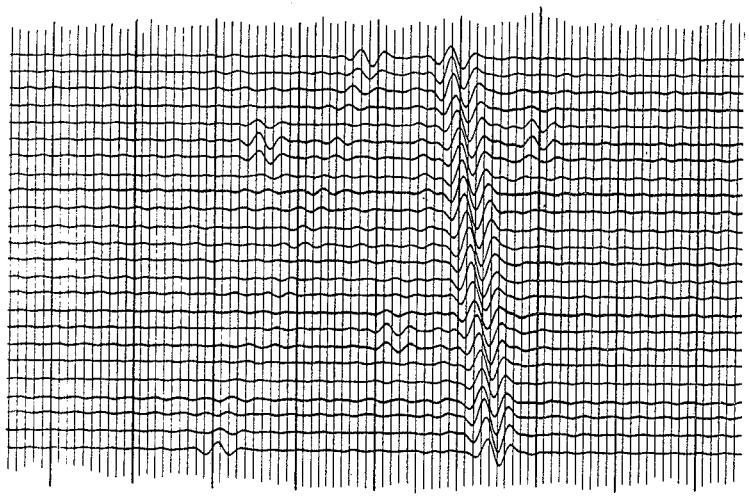
FIGURE 6 is an improved multitrace seismic record produced in the manner of FIGURE 4, from the record of FIGURE 5, showing discrimination against noise components, and also discrimination against an event of undesired moveout.

FIGURES 5 and 6 illustrate some of the moveout filtering capability of the present invention. FIGURE 5 is a sonogram prepared in the same general manner as was FIGURE 3, but the specific difference is that the moveout range was restricted so that the sonogram of FIGURE 5 would not include moveouts as large as that of event $b$ in FIGURE 1. (In actual numbers, the moveout of event $b$ was $(-)185$ milliseconds, which was well included in the $\pm 250$ millisecond moveout range of FIGURE 3, but excluded from the $\pm 150$ milliseconds moveout range of FIGURE 5.)

In FIGURE 5 there is only one obvious set of wiggles showing strongest on the ninth trace. This set of wiggles represents event $c$ of FIGURE 2.

FIGURE 6 is a transformation of FIGURE 5, related to FIGURE 5 exactly as FIGURE 4 was related to FIGURE 3. FIGURE 6 shows event $c$ as clearly as does the original record, FIGURE 2, but it hardly shows event $b$ at all. This illustrates clearly the "moveout filtering" effect of the present invention.

It would be noted on the originals of FIGURES 4 and 6 that the three noncoherent noise pulses are relatively smaller on FIGURE 6 than on FIGURE 4, although it may be difficult to observe this on the reproduced figures accompanying this application. It is a mathematically provable fact that decreasing the moveout acceptance range aids in the discrimination against noise.

Now, if reconsideration is given to the above-described method of preparing the intermediate multitrace record (the sonogram) and subsequently preparing from that intermediate multitrace record the final improved multitrace seismic record, it will be realized that there are at least two principal ways of performing moveout filtering. One way is that used in preparing the records of FIGURES 5 and 6, which is to restrict the moveout acceptance range in preparing the sonogram (FIGURE 5). Another way is to suppress some of the traces of the sonogram in the final step of preparing the improved record. This way is more convenient to use when it is desired to filter out an event of specified moveout smaller than the moveouts of other events desired to be retained.

Figure 7:
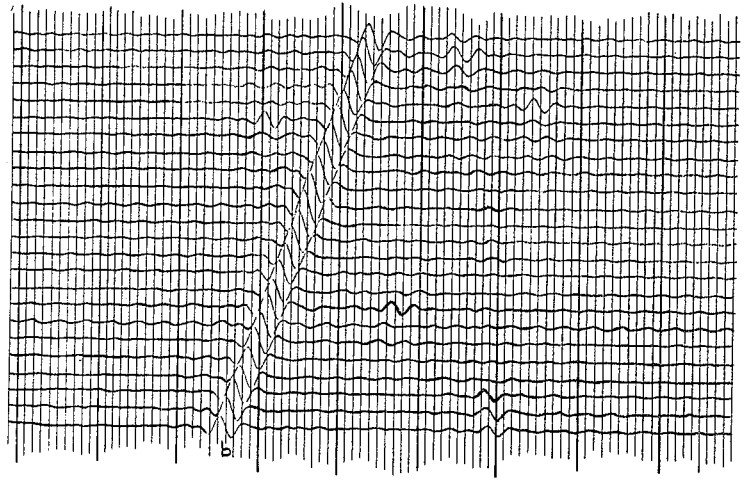
FIGURE 7 is an improved multitrace seismic record derived from FIGURE 3 in such a manner as to discriminate against events of undesired moveout in the second step going from FIGURE 3 to FIGURE 7.

FIGURE 7 shows a final record prepared from the sonogram of FIGURE 3, suppressing those traces of FIGURE 3, particularly the tenth and eleventh, that evidenced event $c$. In FIGURE 7 the event of largest moveout, event $b$, is faithfully reproduced but event $c$ is almost unobservable. It will be noticed also that the three noise pulses are relatively deemphasized with respect to those of event $b$.

Figure 8:
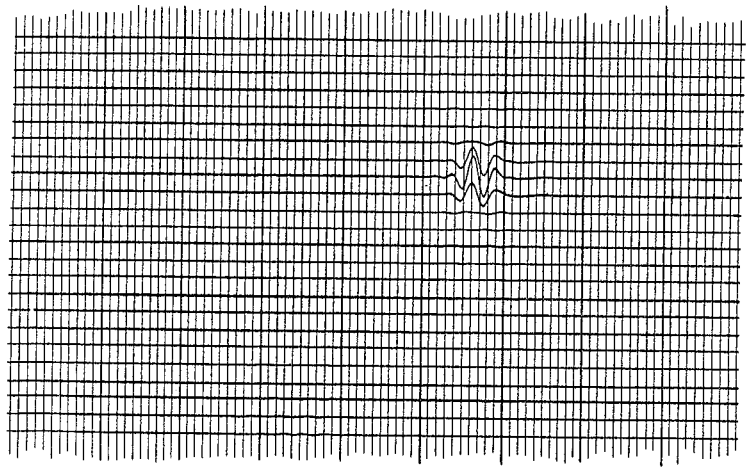
FIGURE 8 is a record of directional traces similar to those of FIGURE 5 except that FIGURE 8 was derived using nonlinear reproduction to discriminate against events not coherent from trace to trace, and events of undesired moveout.
Figure 9:
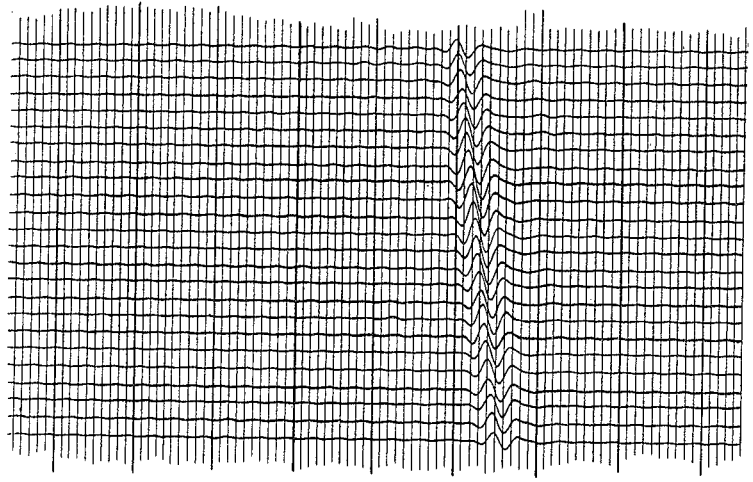
FIGURE 9 is an improved multitrace seismic record derived from FIGURE 8 showing the final effect of the nonlinear reproduction used in preparing FIGURE 8.

FIGURES 8 and 9 show the application of nonlinear amplification to the method of the present invention. (A nonlinear amplifier 39 was shown in FIGURES 1 and 12 in one possible form of surrounding apparatus.) The intermediate record of FIGURE 8 was prepared from the record of FIGURE 2 just as was the intermediate record of FIGURE 5, except that by employing the circuit of FIGURE 12 the nonlinear amplification was used uniformly for all traces in producing the intermediate record, giving large signals proportionally more emphasis than small signals. The only feature that is evident on the record of FIGURE 8 is the set of wiggles representing event $c$ of FIGURE 2.

FIGURE 9 was prepared from FIGURE 8 exactly as FIGURE 6 was prepared from FIGURE 5, and FIGURE 9 shows strikingly how nonlinear amplification can clarify the seismic record leaving only the "events" desired to be examined.

A process of event selection may be employed to pick those events that satisfy certain preset reflection criteria. The event selector 37 may include apparatus of the form illustrated in the copending application of Lee P. Stephenson et al., Ser. No. 842,621, filed Sept. 28, 1959 for "Information Selection Programmer," now US. Patent 3,149,302, issued Sept. 15, 1964. It should be understood that these event selector devices are operative to eliminate signals that do not satisfy the predetermined criteria that are believed to identify reflection signals. When such an event selector is employed, the signals transmitted to the recording head 34 from the device 37 will tend to represent only seismic events without random noise.

Figure 10:
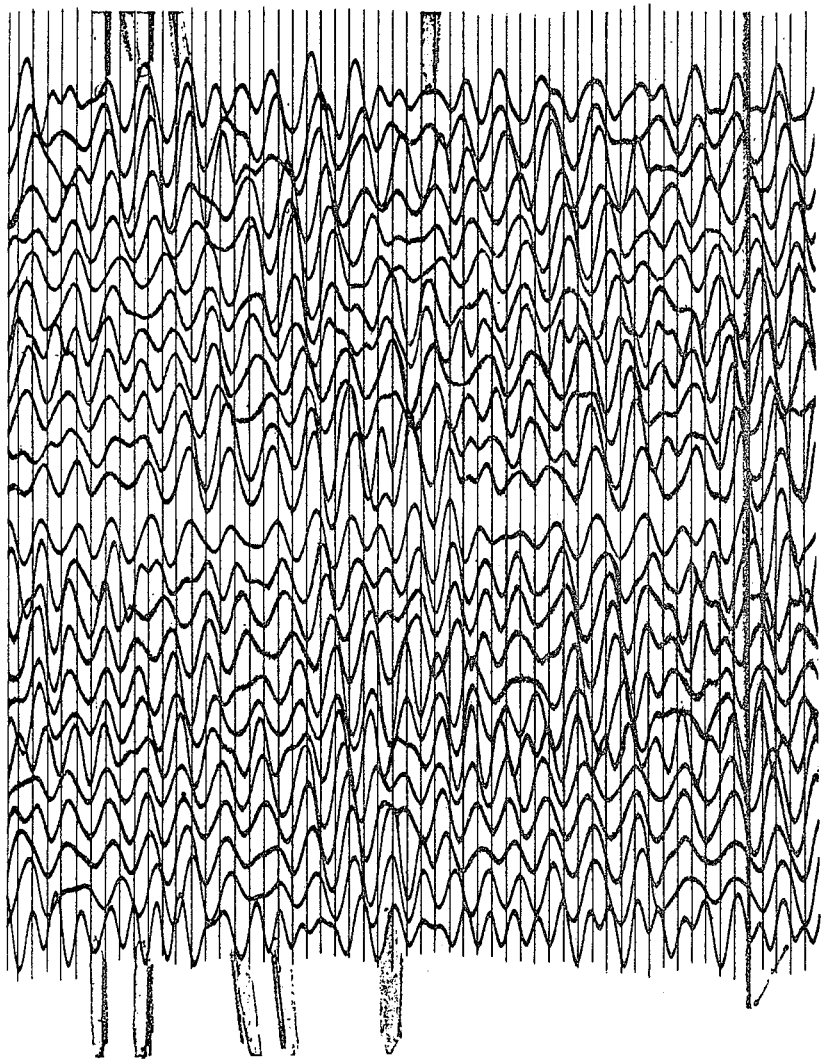
FIGURE 10 is a portion of an actual multitrace seismic record.
Figure 11:
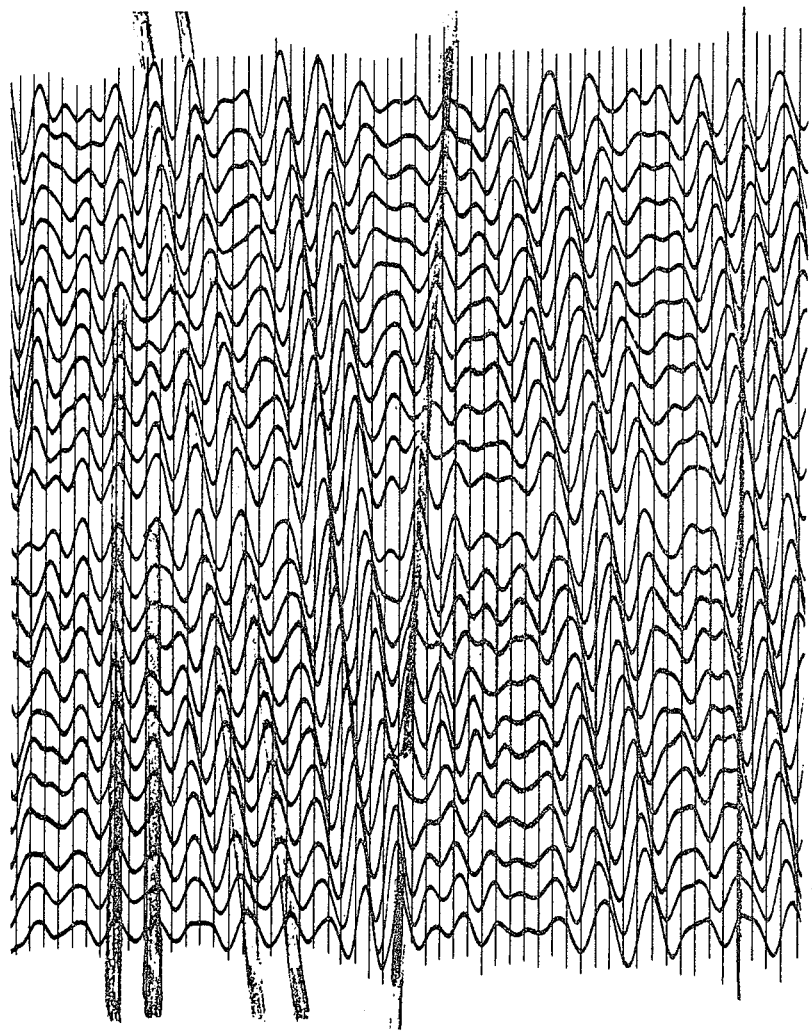
FIGURE 11 is an improved seismic record derived from the record of FIGURE 7 in accordance with the method of the present invention.

FIGURES 10 and 11 illustrate portions of an actual multitrace seismic record processed in accordance with the present invention. FIGURE 10 represents a portion of an actual field record while FIGURE 11 represents the improvement that may be accomplished by processing of the data from a field record in accordance with the methods of the present invention.

It may be seen that with the process of the present invention it is possible to enhance the signals that appear in a coherent alignment across the record while reducing the representation of incoherent noise appearing within the record. Having processed the record in accordance with this invention, the reflection energy represented within the seismic record may be more readily evaluated by persons skilled in the art of analysis of seismic records.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:
1. A method of producing an improved multitrace seismic record from an original seismic record constituting a plurality of side-by-side individual traces of amplitude-versus-arrival-time, machine-readable representations where the amplitude value of the representations in each trace may be read as electrical signals varying with respect to time along each trace, comprising the steps of:
   (a) reading a set of electrical signal values across said traces, one signal value from each of said traces of said multitrace original record, said read electrical signal values being at different arrival times on each trace, the different arrival times differing by a constant amount from trace to trace, and all of said arrival times being measured with respect to a reference arrival time on one of said original traces,
   (b) summing said set of read electrical signal values to produce an electrical signal representing said sum and recording with respect to said reference arrival time a machine-readable representation of said sum on a trace of an intermediate machine-readable record,
   (c) reading another set of electrical signal values across said traces, one signal value from each of said traces of said multitrace original record, said another set of said read electrical signal values being at sub- sequent arrival times along each trace and being at different arrival times on each trace, said different arrival times differing by the same constant amount from trace to trace as in step (a), but all of the arrival times being incrementally later along said multitrace original record than those in step (a), (d) summing said another set of read electrical signal values to produce an electrical signal representing another sum and recording a machine-readable representation of said another sum on said trace of said intermediate machine-readable record at a time with respect to said reference arrival time representing said incrementally later arrival time along said multitrace original record, (e) repeating steps similar to steps (c) and (d) a plurality of times to produce at least a portion of a sum trace on said intermediate record, said sum trace being characterized by said constant amount by which said different arrival times differed from trace to trace in steps (a) and (c), (f) repeating steps (a) through (e) except for a change in the constant amount by which said arrival times differ from trace to trace to produce at least a portion of another sum trace on said intermediate record, said another sum trace being characterized by the changed constant amount by which said arrival times differ from trace to trace in said repeated steps (a) to (e), (g) repeating step (f) for a plurality of predetermined different constant amounts by which said arrival times differ from trace to trace to produce a plurality of portions of individual sum traces as side-by-side traces on said intermediate record, said sum traces being characterized by their respective individual constant amounts by which said arrival times differ from trace to trace across said original record, (h) treating said intermediate record by steps similar to steps (a) through (g) except that said intermediate record is substituted for said original record, to produce in sequence the plurality of side-by-side traces of said improved multitrace seismic record wherein machine-readable electrical summation signals of signals from individual traces of said intermediate record are represented on traces of said improved record at times along each trace with respect to said reference arrival time on said one of said original traces.

2. The method of claim 1 including limiting said changes of said constant amount by which said arrival times differ from trace to trace in reading said electrical signal values from each trace so as to limit the electrical signals represented in both said intermediate record and in said improved seismic record.

3. The method of claim 1 including nonlinearly reproducing said electrical summation signals along said traces of said intermediate record to discriminate against selectable electrical signals from said original record.

4. The method of claim 1 including limiting said changes of said constant amount by which said arrival times differ from trace to trace in said reading of said electrical signal values from each trace of said original record only to produce said sum traces in said intermediate record of information in said original record having only limited constant arrival time differences.

5. The method of claim 1 including limiting the information in said improved multitrace seismic record by suppressing selected sum traces from said intermediate record when said intermediate record is substituted for said original record.

6. The method of claim 1 including producing said improved multitrace seismic record by limiting said changes of said constant amount by which said arrival times differ from trace to trace in reading said electrical signal values from each trace, and by nonlinearly reproducing said electrical summation signals along said traces of said intermediate record to discriminate against selectable electrical signals from said original record.

7. A method of producing an improved multitrace seismic record from an original multitrace seismic record constituting a plurality of side-by-side individual traces of amplitude-versus-arrival-time machine-readable representations, where the amplitude value of the representations in each trace of said original record may be read as electrical signals varying with respect to time along each trace, said improved multitrace seismic record containing emphasized machine-readable representations along said record derived from signals in said original record having specified moveout orientations with respect to signals having other moveout orientations and signals coherent from trace to trace across the original record are emphasized with respect to incoherent noise, comprising the steps of:

(a) reproducing the electrical signal values from each trace of said original multitrace record and producing a plurality of first sum traces of an intermediate multitrace record, each sum trace of said intermediate record being derived by producing a running sum of said electrical signal values across the traces of the original record at a particular moveout, each trace of the plurality of intermediate traces of said intermediate record representing one of a plurality of moveout oriented running sums of said electrical signal values across said original record, and adjacent traces of said plurality of intermediate traces being derived with equal incremental differences in moveout orientations across said original record, (b) reproducing the electrical signal values from each of said first sum traces of said intermediate record and producing a plurality of second summation traces as traces of said improved multitrace record, each second summation trace of said improved multitrace record consisting of a running sum of said reproduced first sum traces at a particular angle across said traces of said intermediate record, the produced number of second summation traces of said improved multitrace record corresponding at least approximately to the number of traces of said original record.

8. The method of claim 7 including limiting the content of said improved multitrace seismic record by limiting the range of moveout oriented running sums of electrical signal values from said traces of said original record to derive in said improved record only information from the original record having selected limited moveout orientations.

9. The method of transforming an original multitrace recording of machine-readable electrical signals representing seismic energy into an improved multitrace record representing said energy comprising the steps of:

(a) reading the electrical signals in said multitrace recording and sonogramming said read signals to produce a plurality of separate signal summation traces of the instantaneous amplitude variations of said electrical signals representing said seismic energy in each trace of said original multitrace record, each of said separate signal summation traces being characterized by shifts of the time axis of each trace of said original record with respect to one trace of said original record, each trace of said original record having its time axis shifted a fixed increment with respect to the shift of the next adjacent trace, each separate signal summation trace being characterized by control of said fixed increment in shifting of said time axis of said traces of said original record and including a time reference derived from said one trace to identify moveout oriented energy represented by the particular signal summation trace, and recording said separate signal summation traces in sequence as side-by-side traces in an intermediate record including one summation trace representing zero moveout oriented energy and having a time axis based on said one trace of said original record, all other signal summation traces having a time axis aligned with the time axis of said zero moveout summation trace, (b) reading said signal summations in said traces of said intermediate record and sonogramming said read signal summations to produce said improved multitrace record, each trace of said improved multitrace record being produced by summing the instantaneous electrical signal summation variations of said moveout oriented energy represented in all of said separate signal summation traces, each separate summing of said signal summations being characterized by shifts of the time axis of each trace of said intermediate record a fixed increment with respect to said zero moveout summation trace, and each signal summation trace having its time axis shifted a fixed increment with respect to the shift of the next adjacent signal summation trace, and (c) restricting the energy content of said improved multitrace record by controlling the range through which said time axes are shifted in said sonogramming steps.

References Cited
UNITED STATES PATENTS

| | | | |
|---|---|---|---|
| 2,810,898 | 10/1957 | Meiners | 340—15.5 |
| 3,181,643 | 5/1965 | Ehlert et al. | 340—15.5 X |
| 3,193,797 | 7/1965 | Lindsey et al. | 340—15.5 |
| 3,217,828 | 11/1965 | Mendenhall et al. | 340—15.5 |
| 3,223,967 | 12/1965 | Lash | 340—15.5 X |

BENJAMIN A. BORCHELT, *Primary Examiner.*

R. M. SKOLNIK, *Assistant Examiner.*

UNITED STATES PATENT OFFICE
CERTIFICATE OF CORRECTION

Patent No. 3,346,840                      October 10, 1967

Rolando Lara

It is hereby certified that error appears in the above numbered patent requiring correction and that the said Letters Patent should read as corrected below.

Column 1, line 21, strike out "usually positioned at the center of the geophone array." and insert the same after "disturbance is" in line 18, same column 1.

Signed and sealed this 15th day of April 1969.

(SEAL)
Attest:

Edward M. Fletcher, Jr.                          EDWARD J. BRENNER
Attesting Officer                                 Commissioner of Patents